(12) United States Patent
Pepper et al.

(10) Patent No.: US 6,809,991 B1
(45) Date of Patent: Oct. 26, 2004

(54) METHOD AND APPARATUS FOR DETECTING HIDDEN FEATURES DISPOSED IN AN OPAQUE ENVIRONMENT

(75) Inventors: David M. Pepper, Malibu, CA (US); Gilmore J. Dunning, Newbury Park, CA (US); David S. Sumida, Los Angeles, CA (US)

(73) Assignee: Raytheon Company, Waltham, MA (US)

( * ) Notice: Subject to any disclaimer, the term of this patent is extended or adjusted under 35 U.S.C. 154(b) by 0 days.

(21) Appl. No.: 10/348,650

(22) Filed: Jan. 21, 2003

(51) Int. Cl.[7] ............................. G01H 9/00; G01H 29/00
(52) U.S. Cl. ............................. 367/149; 73/655; 73/594
(58) Field of Search ............................. 367/149; 73/594, 73/620, 627, 643, 649, 655, 656

(56) References Cited

U.S. PATENT DOCUMENTS 6,069,843 A    5/2000   DiMarzio et al.

Primary Examiner—Ian J. Lobo
(74) Attorney, Agent, or Firm—Baker Botts L.L.P.

(57) ABSTRACT

An excitation signal is selected and transmitted, and a signal is received containing information produced by a remote object in response to the excitation signal. The information is evaluated to attempt to identify the object, the excitation signal is adjusted on the basis of the evaluation, the adjusted excitation signal is transmitted, and a resulting signal is received and evaluated. A variation involves transmitting an excitation signal, transmitting an optical probe signal, receiving an optical signal which is a reflection of the probe signal and which contains information produced by a remote object in response to the excitation signal, and evaluating the information for the purpose of identifying the object.

21 Claims, 1 Drawing Sheet

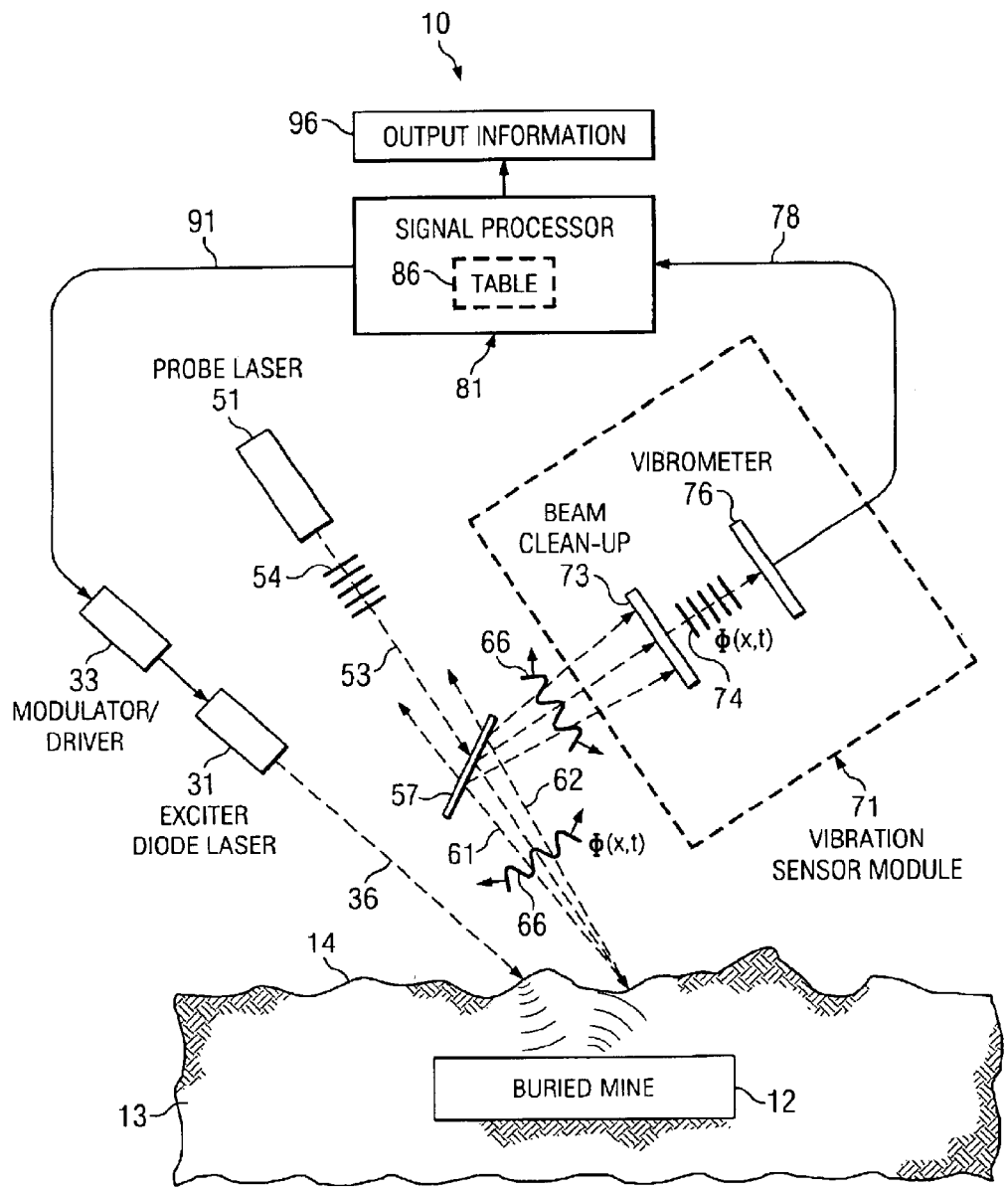

METHOD AND APPARATUS FOR DETECTING HIDDEN FEATURES DISPOSED IN AN OPAQUE ENVIRONMENT

TECHNICAL FIELD OF THE INVENTION

This invention relates in general to technology for detecting hidden features within an opaque environment and, more particularly, to techniques for detecting such hidden features without physical contact with the structure or material of the opaque environment.

BACKGROUND OF THE INVENTION

There are a variety of situations in which it is desirable to be able to detect a hidden feature, characteristic or object disposed within an opaque environment, without any direct physical contact with the material or structure of the opaque environment. One specific example is the detection of landmines that are buried a short distance between the surface of the earth. Pre-existing systems have been developed for the purpose of attempting to detect features within an opaque environment, and have been generally adequate for their intended purposes. However, these pre-existing systems have not been satisfactory in all respects.

In this regard, pre-existing systems typically require a relatively short stand-off distance for interrogation, and have relatively high false alarm rates, including both false positives and false negatives. Further, pre-existing systems tend to have limited inspection rates, such as the rate-of-advance along the ground of a vehicle carrying a system that is being used to detect buried landmines. Moreover, some pre-existing systems are configured only to detect objects, without necessarily identifying them. Other systems that have some identification capabilities do not tend to provide accurate and efficient identification of objects.

SUMMARY OF THE INVENTION

From the foregoing, it may be appreciated that a need has arisen for a method and apparatus for efficient and accurate detection and identification of features disposed within an opaque environment. One form of the invention involves: selecting an excitation signal; transmitting the excitation signal; receiving a signal which contains information produced by a remote object in response to the excitation signal; evaluating the information for the purpose of identifying the remote object; adjusting the excitation signal based on the evaluation of the information; and repeating the transmitting, receiving and evaluating with the adjusted excitation signal.

A different form of the invention involves: transmitting an excitation signal; transmitting an optical probe signal; receiving an optical signal which is a reflection of the probe signal and which contains information produced by a remote object in response to the excitation signal; and evaluating the information for the purpose of identifying the remote object.

BRIEF DESCRIPTION OF THE DRAWINGS

A better understanding of the present invention will be realized from the detailed description which follows, taken in conjunction with the accompanying drawing, which is a diagrammatic view of a detection system that embodies aspects of the present invention.

DETAILED DESCRIPTION

The accompanying drawing is a diagrammatic view of an apparatus which is a detection system 10 that embodies aspects of the present invention. The purpose of the system 10 is to locate and identify features disposed within an opaque environment, such as an object 12 which is a landmine buried beneath the surface 14 of the earth 13. However, detection of landmines is merely one exemplary application for the subject matter of the invention. The present invention can alternatively be utilized in a variety of other contexts. In this regard, the present invention can be utilized in medical applications (for example to detect and identify tumors or gallstones), or in dental applications (for example to detect cavities). Further, the invention can be used to detect objects embedded in walls, to map underground structures, to detect defects and voids in titanium or other metals, or to detect defects embedded in composites. There are a variety of other applications in which the invention can be applied.

Referring to the drawing, the system 10 is supported on a not-illustrated vehicle of a known type, so that the system 10 can be moved relative to the earth 13, in a direction from left to right in the drawing. The not-illustrated vehicle can be a terrestrial vehicle, an airborne vehicle, a space-based vehicle, or some other type of vehicle. The system 10 is designed not only with the ability to determine that an object 12 is present, but also to determine what type of object has been detected. Thus, in the case of the object 12, the system 10 is designed not only to detect the presence of the object 12, but also to determine whether it is a landmine, or some other type of object such as a rock, tree root, discarded bottle, or discarded can. In fact, the system 10 is capable not only of determining what type of object is present, but also additional detail about the object. For example, in the case of a landmine, the system 10 can determine not only that an object is a landmine, but what type of landmine it is (anti-tank mine, anti-personnel mine, and so forth).

The system 10 includes an exciter laser, which in the disclosed embodiment is a diode laser 31. The diode laser 31 includes one or more laser diodes of a known type, and is driven by a modulator/driver circuit 33. The modulator/driver circuit 33 is, in essence, a controlled power supply of a known type which controls the current supplied to the diodes of the laser 31, and thus the intensity of light produced by the diodes. Although the laser 31 in the drawing is a diode laser in which the intensity of the beam can be modulated, it would alternatively be possible to use a continuously operating laser and to temporally modulate the output to produce a modulated optical beam.

The exciter laser 31 periodically emits an excitation signal 36 in the form of one or more beams of laser light. Upon absorption in the ground 13 or in the air near the surface 14 of the ground 13, the beam or signal 36 generates an acoustic excitation along the surface 14, as well in the subsurface, through thermo-elastic and/or ablative effects.

Each pulse of energy emitted by the laser 31 is modulated, in a manner discussed later, so as to achieve a desired acoustic spectrum within the ground. More specifically, the laser modulation can be realized through direct injection-current modulation of the laser diodes in the laser 31. A corresponding acoustic spectrum is then generated within the ground 13, and substantially replicates the modulation format of the signal 36 from the excitation laser 31, subject to acoustic transmission within the ground. The acoustic modes within the ground propagate and scatter due to inhomogeneities, such as the buried object 12. A small portion of these scattered acoustic waves arrive back at the surface 14, resulting in small but detectable surface displacements, on the order of 0.001 wavelength, with surface velocities on the order of 10 to 100 microns per second.

A second laser is used to detect these vibrations at the surface 14, and in particular is the probe laser shown at 51 in the drawing. The probe laser 51 includes one or more lasers, such as laser diodes, which produce a signal 53 containing one or more beams of laser light. In the disclosed embodiment, the beam 53 is somewhat weaker than the beam 36, because less energy is needed for detection than to effect excitation. The signal 53 is essentially a plane wave, as indicated diagrammatically by several parallel lines 54. The signal 53 passes through a splitter plate 57 of a known type, and impinges on the surface 14 of the ground 13.

A portion of the signal 53 which impinges on the surface 14 of the ground 13 will be reflected by the surface, 14. Due to the fact that the surface 14 is experiencing vibrations resulting from the excitation signal 36, the vibrations will be superimposed on the reflected energy of the signal 53. Since the surface 14 can be relatively uneven, the reflected energy from the signal 53 will be scattered in a variety of directions. Nevertheless, a small portion of the reflected energy will travel in directions which are approximately opposite to the direction of travel of the signal 53, as indicated diagrammatically at 61 and 62. This reflected energy 61–62 defines an optical wavefront which is modulated by the ground vibrations, and which is indicated diagrammatically at 66. This wavefront 66 is reflected by the splitter 57, and enters a vibration sensor section or module 71 of a known type.

The vibration sensor module 71 essentially effects optical measurement of vibrations of a remote object, either in the plane of the object or in a direction normal to the plane of the object, or both. The vibration sensor module 71 includes an optical element 73, which effectively cleans up the reflected wavefront 66 by optically converting it into a modulated plane wave, which is indicated diagrammatically at 74. The plane wave 74 then impinges on a vibrometer 76 of a known type. The vibrometer 76 converts the plane wave 74 into electrical signals, which are supplied at 78 to a signal processor circuit 81. The performance of the vibrometer 76 is improved by the fact that the optical element 73 has converted the wavefront 66 into a modulated plane wave.

Although the drawing shows one specific type of vibration sensor module 71, it would alternatively be possible to use a variety of other types of optical devices. Examples include a module which combines the probe laser and heterodyne detector into a common package, as well as Doppler or micro-Doppler receivers. The devices can either process a single spatial mode (or speckle), or can process highly aberrated beams as well as depolarized beams to improve the system performance and signal-to-noise figure. In the latter case, beam clean-up techniques can be used prior to a single-speckle vibrometer, such as the beam clean-up techniques performed by the optical element 73 in the disclosed embodiment. Another technique is to employ an adaptive photodetector, which performs the combined functions of photodetection and beam cleanup (or wavefront matching) on a single detector device. In still another approach, multiple probe and/or excitation beams can emulate a phased array system for enhanced spatial resolution, sensitivity, or full-frame imaging through parallel processing.

The signal processor circuit 81 can be implemented with a known type of device, such as a digital signal processor (DSP) or a microcontroller, which includes a central processor, random access memory and read only memory. The read only memory in the signal processor 81 stores a computer program which is executed by the central processor, and which analyzes the information in the electrical signals received at 78 from the vibration sensor module 71. This information will be representative of the detected vibrations at the surface 14, which in turn will be representative of whatever is present below the surface 14, including not only the object 12 but also the earth 13.

The information stored in the memory of the signal processor 81 includes a look-up table 86, which stores a variety of predetermined data patterns that correspond to a variety of different objects which might be encountered, such as respective patterns characteristic of a rock, a tree root, a can, a bottle, a landmine and so forth. In fact, these patterns can include a variety of different data patterns representing a variety of different objects of a given type, such as a variety of different landmines. In addition, for each given object, a variety of different data patterns may be present to represent that object under respective different environmental conditions. For example, for a given type of landmine, there may be a variety of data patterns representing acoustic properties of that landmine when respectively buried in dry earth, mud, gravel, sand, and so forth.

The signal processor 81 compares the vibration information in the electrical signals received at 78 to the patterns stored in the look-up table 86, in order to determine whether a buried object appears to be present and, if so, what that object appears to be. Thus, for example, to the extent that the signal processor 81 receives electrical signals at 78 which contain information representing vibrations caused in part by the landmine 12, the signal processor 81 compares this information to the predefined data in the look-up table 86, in order to determine (1) that an object is present and (2) that the detected vibrations appear to be similar to those which a landmine would be expected to produce.

For purposes of this discussion, assume that the signal processor 81 determines that the object 12 is present, and then makes a preliminary determination that the object 12 appears to be a landmine. The signal processor 81 then produces electrical control signals at 91 which effect control of the excitation laser 31 through the modulator/driver circuit 33. The signals 91 change the characteristics or format of the excitation signal 36, in order to adjust the acoustic modes excited in the ground 13 by the signal 36 so as to achieve acoustic modes that couple most effectively to the acoustic modes of the type of object which the signal processor 81 believes is present, and not to other types of objects. The format of the energy can be matched to multi-spectral modes of the object 12 which is being analyzed.

As one aspect of this, the resonant frequencies of one type of object, such as a landmine, are significantly different from the resonant frequencies of other objects, such rocks, tree roots, cans and bottles. Thus, the adjusted excitation signal 36 produces acoustic modes within the ground 13 to which the particular object 12 is especially responsive, causing the object 12 to have a more pronounced effect on the overall vibrations produced within the earth 13 and thus at surface 14 in response to the excitation energy.

The probe laser 51 and vibration sensor module 71 will in turn detect the modified vibrations which are now occurring at the surface 14 as a result of the modified excitation signal, and will forward information 78 representative of these modified vibrations to the signal processor 81. The signal processor 81 will then analyze the modified vibrations, in order to evaluate whether, in comparison to the original signals, they do or do not seem to embody any enhancement that is likely to be due to resonance relating to the detected object 12. If there is such an enhancement, then the object is likely to be a landmine, thereby confirming the prior tentative assessment by the signal processor circuit 81. On the other hand, if the modified vibrations do not reflect an enhancement of the type that would result from resonance of the object 12, then the circuit 81 will conclude that the object is probably not a landmine, and will try various other modified excitation signals in order to determine what other type of object it is. If necessary, the signal processor 81 can effect a series of successive adjustments in the signals 91 which control the excitation laser 31, until it makes a determination of what type of object is present, for a given set of environmental conditions.

Thus, through a somewhat iterative process, the signal processor 81 effects feedback control of the excitation signal 36, in order to progressively narrow in on an accurate identification of what type of object is present at 12. The signal processor 81 can output information at 96, for example to a display or an external computer, to indicate not only that an object 12 has been detected, but also to indicate whether the detected object is a landmine, a rock, a tree root, a bottle, a can or some other type of object.

The signal processor 81 can be operated in a first mode in which the output information 96 contains some form of indication for every object 12 which is encountered. Alternatively, the signal processor 81 can be operated in a second mode in which it is looking for a particular type of object, such as a landmine, and in which it therefore limits the output information 96 to indications of detected objects that it has concluded are landmines.

The excitation source 31 and modulator 33 could be replaced with a plurality of devices that each produce a modulating beam directed to a respective different location on the surface 14. The probe laser 51 and vibration sensor module 71 could be configured to transmit and receive multiple beams, with each beam interrogating surface vibrations at a respective different location on the surface 14. Respective electrical signals representing each of the multiple output signals from the vibration sensor module would then be provided to a common processor, similar to the processor 81. The processor would then produce appropriate output information, corresponding to that shown at 96 in the drawing, and would also produce a plurality of control signals corresponding to the control signal 91, in order to control each of the multiple excitation beams. This extended system would provide increased sensitivity and spatial resolution, as well as increased inspection and imaging speed, in comparison to a system of the type shown in the drawing, which has a single excitation beam and a single probe beam. The multiple beam system would also be more robust when confronted with buried objects that are under and obscured by other objects, such as rocks, tree roots, wet regions, and so forth.

As mentioned above, the lasers 31 and 51 in the illustrated embodiment use laser diodes. However, it would alternatively be possible for each of these lasers to be implemented with some other type of laser device. For example, the excitation laser 31 could be some other type of laser which can be modulated, either through direct modulation of the laser (for example through modulation of pump diodes in a diode-pumped fiber laser), or through use of an external modulator in association with a continuous-wave or quasi-continuous-wave laser.

As discussed above, the signal processor 81 in the disclosed embodiment effects feedback control using a relatively straightforward process which involves use of a look-up table 86. However, it would alternatively be possible to use any of a variety of more sophisticated techniques, separately or in combination, including fast Fourier transforms, sensor fusion algorithms, neural network classifiers, hyperspectral acoustic image processing, feature extraction techniques, and so forth. Use of neural network techniques would permit the signal processor 81 of the system 10 to be "trained" in realtime through on-the-spot evaluation of the detailed, complex transform frequency components of the detected information.

The present invention provides a number of advantages. One such advantage results from adjustment of the excitation signal with a closed loop system, thereby permitting the system to optimally excite acoustic modes that can most effectively couple to the acoustic modes of the type of object which is of interest. The system thus discriminates against objects which are not of interest, while minimizing background clutter and noise, thereby minimizing false positives from extraneous objects. The invention thus enhances the sensitivity and ability of the system to detect and classify the presence of a selected feature or object.

Moreover, through feedback control of the excitation signal, the energy of the excitation signal is optimally utilized, thereby providing enhanced performance, and a higher rate-of-advance for a vehicle on which the system is mounted. Adjustment of the excitation signal with feedback control also permits more effective classification of a buried object in a variety of ways, including not only identification of the object, but also identification of shape, density, two-dimensional or three-dimensional mapping, and/or discrimination between solid and hollow objects. The system can identify and discriminate objects more rapidly than pre-existing systems that use open-loop architectures. The system also reduces the occurrence of false alarms, including both false positive and false negatives. The system is capable of effecting non-contact interrogation with a relatively long stand-off distance, and can be utilized in a variety of different applications.

Although one embodiment has been illustrated and described in detail, it will be understood that various substitutions and alterations are possible without departing from the spirit and scope of the present invention, as defined by the following claims.

What is claimed is:

1. A method comprising:
   selecting an excitation signal;
   transmitting said excitation signal;
   receiving a signal which contains information produced by a remote object in response to said excitation signal;
   evaluating said information for the purpose of identifying said remote object;
   adjusting said excitation signal based on said evaluating of said information;
   repeating said transmitting, receiving and evaluating using said adjusted excitation signal;
   transmitting a probe signal; and
   wherein said received signal is a reflection of said probe signal.

2. A method according to claim 1, including:
   causing said excitation signal to impinge on a remote material which has said remote object therein;
   causing said remote object to respond to energy from said excitation signal by generating vibrations; and
   causing said probe signal to impinge on and be reflected by said remote material, said information in said received signal corresponding to said vibrations produced by said remote object.

3. A method according to claim 1, wherein said transmitting of said excitation signal is carried out using a laser.

4. A method according to claim 3, wherein said transmitting of said probe signal is carried out using a laser.

5. A method according to claim 4, wherein said receiving of said received signal is carried out using a vibration sensor module.

6. A method according to claim 4, wherein said receiving of said received signal includes converting said received signal from an optical wavefront to a plane wave, and extracting said information from said plane wave by optically detecting characteristics in said plane wave which represent physical vibrations of a remote material that reflected said probe signal.

7. An apparatus comprising:

an excitation source which transmits an excitation signal;

a receiver which receives a signal that contains information produced by a remote object in response to said excitation signal;

a circuit coupled to said excitation source and said receiver, said circuit being operative to:

cause said excitation source to transmit said excitation signal in a selected form;

thereafter evaluate said information corresponding to said selected form of said excitation signal for the purpose of identifying said remote object;

thereafter determine an adjusted form for said excitation signal based on said evaluation of said information;

thereafter cause said excitation source to transmit said excitation signal in said adjusted form;

thereafter evaluate said information corresponding to said adjusted excitation signal for the purpose of identifying said remote object; and a probe source which transmits a probe signal, said received signal being a reflection of said probe signal, said excitation signal impinging on a remote material which has said remote object therein, said remote object responding to energy from said excitation signal by generating vibrations, said probe signal impinging on and being reflected by said remote material, and said information in said received signal corresponding to said vibrations produced by said remote object.

8. An apparatus, comprising:

an excitation source which transmits an excitation signal;

a receiver which receives a signal that contains information produced by a remote object in response to said excitation signal;

a circuit coupled to said excitation source and said receiver, said circuit being operative to:

cause said excitation source to transmit said excitation signal in a selected form;

thereafter evaluate said information corresponding to said selected form of said excitation signal for the purpose of identifying said remote object;

thereafter determine an adjusted form for said excitation signal based on said evaluation of said information;

thereafter cause said excitation source to transmit said excitation signal in said adjusted form;

thereafter evaluate said information corresponding to said adjusted excitation signal for the purpose of identifying said remote object; and a probe source which transmits a probe signal, said received signal being a reflection of said probe signal.

9. An apparatus according to claim 8, wherein said excitation source includes a laser.

10. An apparatus according to claim 9, wherein said probe source includes a laser.

11. An apparatus according to claim 10, wherein said receiver includes a vibration sensor module.

12. An apparatus according to claim 10, wherein said receiver includes a first portion which converts said received signal from an optical wavefront to a plane wave, and a second portion which extracts said information from said plane wave by optically detecting characteristics in said plane wave which represent physical vibrations of a remote material that reflected said probe signal.

13. A method, comprising:

transmitting an excitation signal;

transmitting an optical probe signal;

receiving an optical signal which is a reflection of said probe signal and which contains information produced by a remote object in response to said excitation signal;

evaluating said information for the purpose of identifying said remote object; and adjusting said excitation signal based on said evaluating of said information.

14. A method according to claim 13, wherein said transmitting of said excitation signal includes transmitting said excitation signal as an optical signal.

15. A method according to claim 14, including configuring each of said optical excitation signal and said optical probe signal to be a beam of laser light.

16. A method according to claim 15, wherein said receiving of said received signal is carried out using a vibration sensor module.

17. A method according to claim 13, including:

causing said excitation signal to impinge on a remote material which has said remote object therein;

causing said remote object to respond to energy from said excitation signal by generating vibrations; and causing said probe signal to impinge on and be reflected by said remote material, said information in said received signal corresponding to said vibrations produced by said remote object.

18. An apparatus, comprising:

a first transmitter that transmits an excitation signal;

a second transmitter that transmits an optical probe signal;

a receiver that receives an optical signal which is a reflection of said probe signal and which contains information produced by a remote object in response to said excitation signal;

a circuit that evaluates said information for the purpose of identifying said remote object; and wherein said control circuit adjusts said excitation signal based on said evaluation of said information.

19. An apparatus according to claim 18, wherein first transmitter transmits said excitation signal as an optical signal.

20. An apparatus according to claim 19, wherein each of said first and second transmitters includes a laser.

21. An apparatus according to claim 20, wherein said receiver includes a vibration sensor module.

* * * * *

UNITED STATES PATENT AND TRADEMARK OFFICE
CERTIFICATE OF CORRECTION

PATENT NO. : 6,809,991 B1
DATED : October 26, 2004
INVENTOR(S) : David M. Pepper et al.

It is certified that error appears in the above-identified patent and that said Letters Patent is hereby corrected as shown below:

Column 3,
Line 13, after "surface" delete ",".

Column 6,
Line 54, before "transmitting" insert -- including --.

Column 7,
Lines 17 and 47, after ";" insert -- and --.
Lines 34 and 63, before "a probe source" insert -- including --.

Column 8,
Line 24, before "adjusting" insert -- including --.

Signed and Sealed this

Eleventh Day of October, 2005

JON W. DUDAS
*Director of the United States Patent and Trademark Office*